W. F. FOLMER.
CAMERA BACK.
APPLICATION FILED JAN. 31, 1918.
1,270,281.
Patented June 25, 1918.
2 SHEETS—SHEET 2.
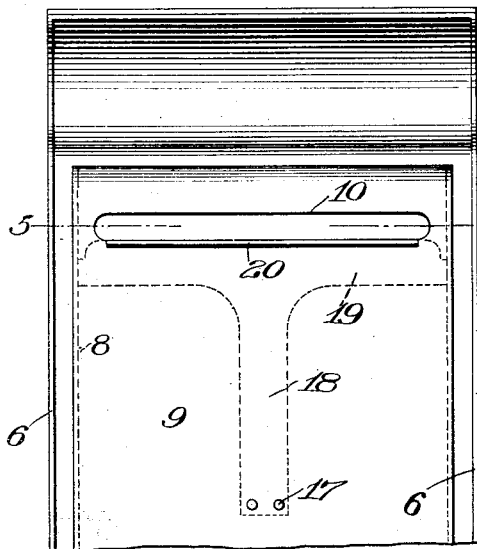
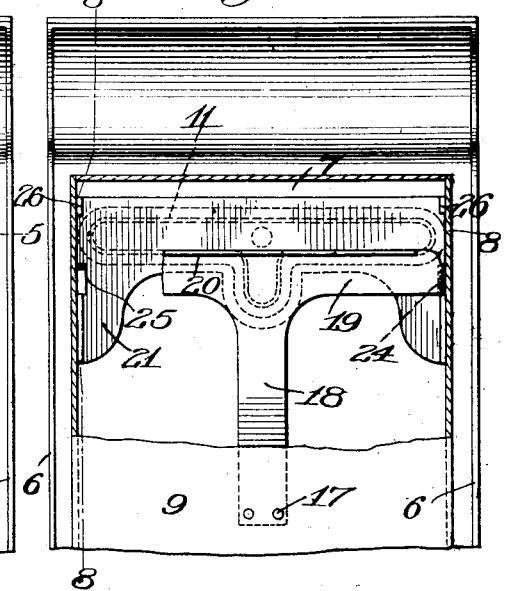
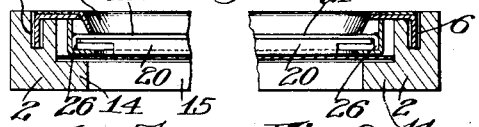
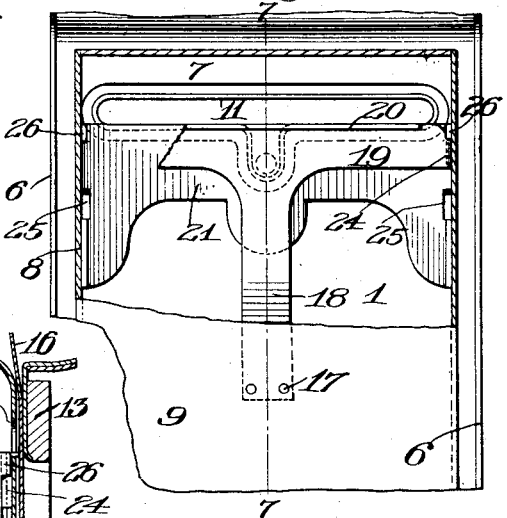
WITNESSES:
Walter B. Payn
George D. Powell
INVENTOR.
William F. Folmer
BY Church & Rix
his ATTORNEYS.

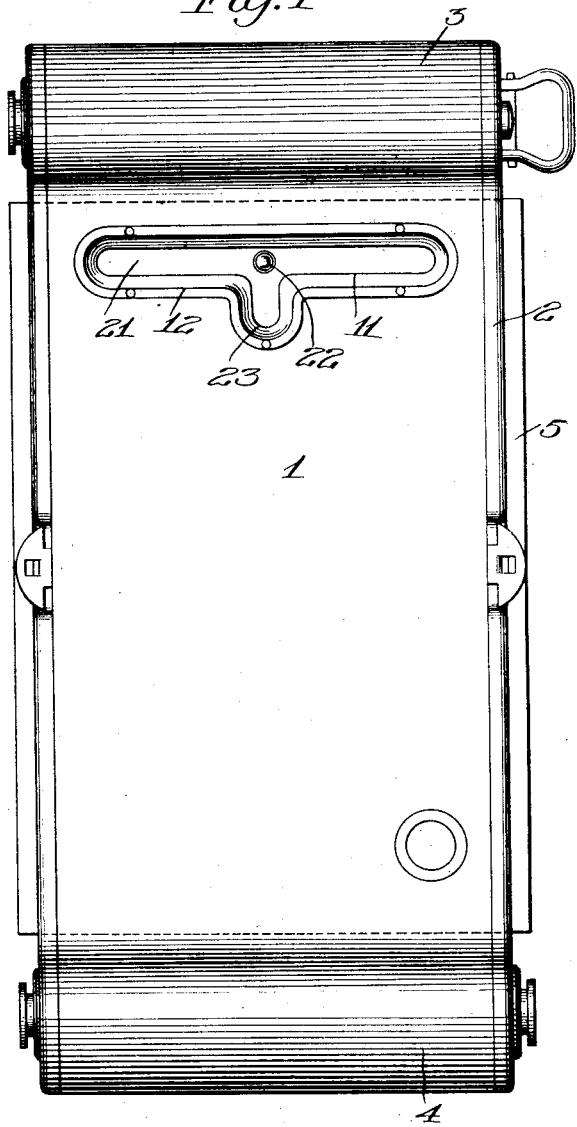
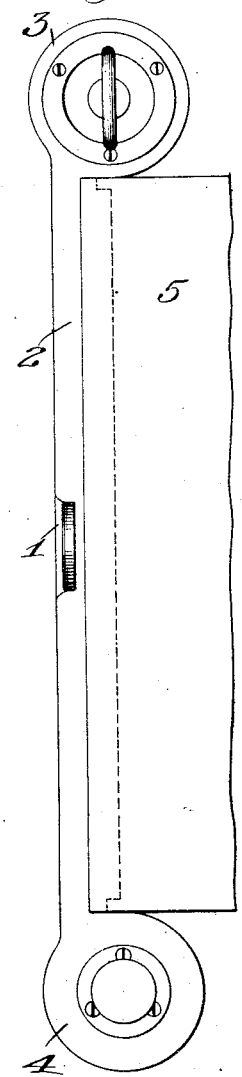

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

CAMERA-BACK.

1,270,281.   Specification of Letters Patent.   Patented June 25, 1918.

Application filed January 31, 1918. Serial No. 214,576.

*To all whom it may concern:*

Be it known that I, WILLIAM F. FOLMER, of Rochester, in the county of Monroe and State of New York, have invented certain new and useful Improvements in Camera-Backs; and I do hereby declare the following to be a full, clear, and exact description of the same, reference being had to the accompanying drawings, forming a part of this specification, and to the reference-numerals marked thereon.

My present invention relates to photography and more particularly to photographic cameras of the type in which provision is made for gaining limited access to the interior through the back for the purpose of marking identifications upon the contained sensitive element, and the invention has for its object to provide a simple, cheap and efficient camera back of this nature wherein an improved combined structure is utilized to open and close the identification opening and automatically actuate a clamp for holding the sensitive element stationary while being marked upon. To these and other ends the invention resides in certain improvements and combinations of parts all as will be hereinafter more fully described, the novel features being pointed out in the claims at the end of the specification.

In the drawings:

Figure 1 is a rear elevation of a camera back constructed in accordance with and illustrating one embodiment of my invention;

Fig. 2 is a side elevation thereof, both Figs. 1 and 2 showing the back as part of a film roll adapter applied to a camera body;

Fig. 3 is a front elevation of one end of the back removed;

Fig. 4 is a view similar to Fig. 3 with certain parts broken away and others in section;

Fig. 5 is a transverse section taken substantially on the line 5—5 of Fig. 3;

Fig. 6 is a view similar to Fig. 4 with the parts in another position;

Fig. 7 is a fragmentary section taken substantially on the line 7—7 of Fig. 6, showing the door or closure for the opening in the back in open position;

Fig. 8 is a section taken substantially on the line 8—8 of Fig. 4, showing the door or closure in closed position, and Fig. 9 is a fragmentary view similar to Fig. 8 but showing the door in open position.

Similar reference numerals throughout the several views indicate the same parts.

In the present instance, I have illustrated a back 1 as part of a film roll adapter 2 having roll chambers 3 and 4 and applied to a camera body 5 in the usual manner. The back itself comprises a body portion having light excluding flanges 6 (Figs. 3, 4 and 5) and provided on its front or inner face with a cavity 7 formed within a frame 8. Over the front of this frame is applied a front plate 9 and the latter and the body portion are provided with registering openings 10 and 11, respectively, through which access to the interior is gained for the purpose of marking the sensitive material, the opening 11 preferably being bordered by a frame or holding 12. Referring to Figs. 7, 8 and 9, these openings 10 and 11 come opposite the rail 13 of a frame 14 of the roll holder that defines the exposure opening 15 and between which frame and the back the film 16 is fed so that the said rail 13 forms a table or support against which the film is pressed while being written upon by an instrument inserted through the opening.

In practice of my invention, I secure at 17 to the inner or rear face of the cover plate 9 the spring tongue 18 of a clamp 19 that extends transversely across the plate. This spring clamp has a flange 20 lying in the opening 10 along one edge thereof and as the jaw is pressed forwardly, this flange clamps the film 16 against the table 13 as is Figs. 7 and 9 and holds it steady and also prevents light from leaking to the body of the film.

The spring tongue 18 normally holds the said flange 20 of the clamp retracted from against the film, as in Fig. 8.

The light is admitted through the opening 10—11 in the back only during the marking and the simultaneous light printing of the designations on the film and it is normally closed to the entrance of light by a sliding door having an operating knob 22 that works in an extension 23 of the opening 11. At the ends of the jaw plate 19 are rearwardly turned cam flanges or lugs 24. When the door is closed as in Fig. 8, these lugs enter notches or openings 25 in the corresponding edges of the door so that the clamp holds itself away from the film and the latter is free to be fed, as shown. When, however, the door is slid back and opened, it rides the cam flanges 24 out of these notches 25 and, through the medium thereof, presses the clamping edge 20 against the film as in Figs. 7 and 9 against the tension of the spring tongue 18. Upon this movement, forwardly turned lugs or flanges 26 on the edges of the door abut the cam flanges 24 on the clamp and limit and define the open position of the door as shown in Fig. 9. As the door is closed again, the cam flanges 24 reënter the notches 25 and the spring clamp 19—20 retracts itself to release the film, as in Fig. 8, it being necessary, of course, to clamp the film only while the door is open, making the marking thereof possible.

I claim as my invention:

1. The combination with a camera back comprising a body portion having a cavity therein and an opening to permit designations to be made therethrough upon a contained sensitive element and a front plate on the body portion provided with an opening registering with that in the body portion of a sliding door guided in the cavity to close both openings, and a clamp arranged between the body portion and plate and projecting through the opening in the latter to engage the sensitive element, said clamp being actuated by the opening movement of the door.

2. The combination with a camera back comprising a body portion having a cavity therein and an opening to permit designations to be made therethrough upon a contained sensitive element and a front plate on the body portion provided with an opening registering with that in the body portion, of a sliding door guided in the cavity to close both openings, and a spring clamp carried on the inner side of the front plate and having a flange projecting through the opening in the latter to engage the sensitive element, said clamp being actuated against the latter by the opening movement of the door.

3. The combination with a camera back comprising a body portion and a front plate secured thereto, said parts having registering openings to permit designations to be made therethrough upon a contained sensitive element, of a sliding door confined between said members to open and close the openings therein and a spring clamp adapted to engage the sensitive element through the openings and provided with a tongue securing it to the inner side of the front plate, said clamp also being provided with lateral cam flanges adapted to be engaged by the door to actuate the clamp when the door is moved to open position.

4. The combination with a camera back comprising a body portion and a front plate secured thereto, said parts having registering openings to permit designations to be made therethrough upon a contained sensitive element, of a spring clamp secured to the inner side of the front plate and adapted to engage the sensitive element through the opening therein, said clamp being provided with lateral cam flanges and a sliding door for the openings coöperating with the cams on the clamp to actuate the latter when the door is opened, said door being provided with shoulders yieldably coöperating with the cams to maintain the door in adjusted position.

WILLIAM F. FOLMER.

Witnesses:
RUSSELL B. GRIFFITH,
AGNES NESBIT BISSELL.

Copies of this patent may be obtained for five cents each, by addressing the "Commissioner of Patents, Washington, D. C."